March 27, 1934. H. HUEBER 1,952,863
REAR VIEW MIRROR
Filed May 15, 1930
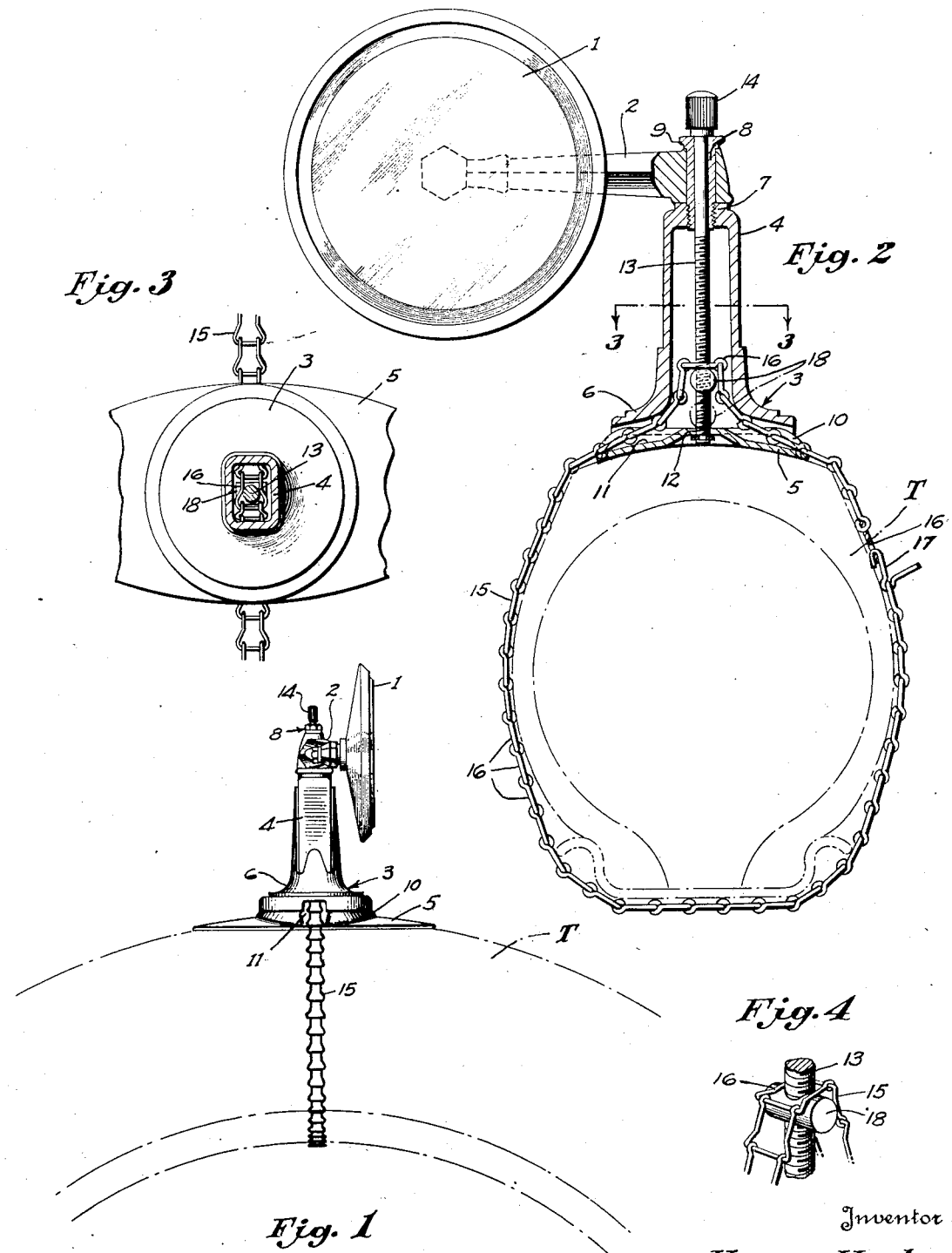
Inventor
Henry Hueber
By Barton A. Beau Jr
Attorney Patented Mar. 27, 1934

1,952,863

UNITED STATES PATENT OFFICE 1,952,863

REAR VIEW MIRROR

Henry Hueber, Buffalo, N. Y., assignor to Trico Products Corporation, Buffalo, N. Y.

Application May 15, 1930, Serial No. 452,740

6 Claims. (Cl. 24—19)

This invention relates to rear view mirrors for automobiles and it has particular relation to such mirrors as are adapted to be mounted on spare tires carried on the running boards or front fenders of motor vehicles adjacent the engine hood.

Rear view mirrors of this type are located to the front and to the left or right of the drivers of the motor cars depending upon whether the mirrors are mounted on the left or right side of the vehicles. By this positioning of the mirrors the drivers need glance only slightly to the right or left in order to observe the reflected images of traffic conditions to the rear, when the mirrors are in proper adjustment. Mirrors of this type are exposed to rain, sleet and snow and also to mud and dirt thrown from the wheels of the vehicles to which they are attached and also from passing vehicles. They are also subjected to vibration, jars and shocks transmitted from the motors and running gear of the motor cars upon which they are mounted.

It is an object of this invention to provide a mirror which may be readily and easily mounted upon, adjusted to proper position on, and removed when necessary from, spare tires on automotive vehicles.

Another object of the invention is to provide a mounting for such mirrors wherein adjustable parts are substantially shielded from rain, sleet, snow, mud and dirt.

Another object is to provide a mirror mounting of durable and compact construction, the parts of which will be firmly secured to each other and to the spare tire and which will not easily be jarred from operable position.

The invention resides in the structural formation and arrangement of the parts which will be fully set forth in the following description, reference being made to the accompanying drawing wherein:

Fig. 1 is a side elevation of the improved mirror mounted on a spare tire, the latter being shown in broken lines.

Fig. 2 is an enlarged vertical section looking toward the front of the vehicle, the spare tire, appearing in cross section, being indicated by broken lines.

Fig. 3 is a top sectional view taken on line 3—3 of Fig. 2.

Fig. 4 is a detail perspective view of the anchor adjusting means.

Referring more particularly to the drawing in which like parts are indicated by like reference numerals, 1 designates the reflector body of the rear view mirror mounted on a mirror supporting arm 2. This arm 2 is superposed upon a multi-part supporting standard indicated generally at 3. The standard comprises an upper tubular part 4 and a lower member 5 which may be secured together in any suitable manner. The tubular part 4 may be of comparatively small, substantially rectangular cross-section, tapering slightly from top to bottom. It is preferably flared at its base as indicated at 6 and is substantially closed at its upper extremity by a flat web 7. The web has a central threaded aperture into which is turned a sleeve 8, the lower portion of which is threaded, and which is provided at its top with a hexagonal shouldered portion 9.

The sleeve 8 extends through an aperture provided in the mirror supporting arm 2, the under surface of the hexagonal shoulder 9 frictionally engaging a portion of the upper surface of the arm.

The lower or saddle portion 5 of the standard is substantially elliptical in outline and dished to conform to the surface of the tire designated T, on which it rests. The member 5 is provided with an upwardly pressed portion 10 which provides a flat seat for the tubular part 4 of approximately the diameter of flared portion 6.

The upwardly pressed portion 10 has oppositely disposed recesses 11 and a central aperture 12 for purposes which hereinafter will be disclosed.

Extending through sleeve 8, tubular member 4 and the aperture 12 in member 5 is an elongated shank 13 having a lower threaded portion and an enlarged manipulating head 14 which may be fluted or knurled for easily gripping with an ordinary wrench or pliers. The under surface of the head 14 abuts the upper surface of sleeve 8, while the extreme lower end of the shank is provided with retaining means. This is preferably done by deforming the lower end of the shank as by riveting. The aperture 12 and the inner diameter of sleeve 8 are slightly larger than the shank 13 in order that the shank may be easily rotated therein.

The standard is secured to the spare tire by a flexible anchoring member 15 which passes completely about the tire T. This member may embody many different forms but it is preferred to use a steel link chain, the links being designated at 16. One end of the chain is equipped with a hook 17 adapted to engage with the link 16 at the opposite end.

An intermediate portion of the chain passes through the tubular standard 3, through the openings which are provided by recesses 11. The shank 13 extends through one of the links 16 as is clearly shown in Fig. 3. A cylindrical adjusting or slack take-up block 18 is threaded to shank 13 and is disposed beneath the link 16 through which the shank 13 passes.

Before mounting the rear view mirror on a spare tire the various parts are assembled to the form best shown in Fig. 2, the relative positions of the shank 13 and block 18 being shown by the dotted lines, and the hook 17 being disconnected from the end link 16.

The device is then placed upon a spare tire as shown in Fig. 1 and the free ends of the chain or flexible anchoring element are brought together about the tire and connected as shown in Fig. 2.

The shank 13 is now rotated in a clockwise direction by means of head 14 thus drawing upwardly the block 18, which is held against rotation by engagement of chain 15. The block 18 in its upward movement longitudinally of the standard 3 carries with it the portion of the chain which it engages. Obviously this will increase the length of chain within the standard and decrease the effective length of the chain or the portion outside of the standard.

When the chain is drawn taut and the parts are in the full line position of Fig. 2 it will be impossible for the hook to become disengaged from the link 16 to which it is connected. The rear view mirror will therefore be firmly held in position upon the spare tire until the shank 13 is turned in a counter-clockwise direction and the tension on the flexible anchoring member is thus released whereupon the hook may be disengaged.

When the standard is securely mounted in position the mirror supporting arm 2 may be adjusted by turning the sleeve 8 in a counter-clockwise direction, thus freeing the arm, rotating the arm to proper position, and then rotating the sleeve clockwise, thus securely clamping arm 2 between shoulders 9 and web 7.

What is claimed is:

1. In a bracket adapted to be mounted on spare tires, a standard comprising an upper tubular member superposed upon a lower base member having recesses in its upper surface, a threaded shank passing through said members and rotatably secured thereto, an adjusting block threaded upon said shank, and a flexible anchoring member extending through said recesses in the base member into said standard and operably associater with said adjusting block.

2. In combination, an accessory supporting standard comprising a base member and a tubular part seated thereon, a flexible anchoring member, said standard having an opening therein between the base and tubular part passing said anchoring member, a shank passing through the tubular part and base, means on the ends of said shank for abutting opposed surfaces of the tubular part and base for retaining them together, and a take-up block threaded to the shank and engaging said flexible member, whereby, upon rotation of the shank, the effective length of the flexible member may be varied.

3. An accessory supporting standard to be mounted upon a spare tire, comprising a tubular portion and a base part secured to said tubular portion, said base part abutting the tire and being of oblong shape with end portions extending oppositely from the standard along the overall circumference of the tire, and the underside of said oblong base being concaved longitudinally and transversely to fit the contour of the abutting surface of the tire, said standard having an opening therein at the base thereof, a flexible anchoring member extending about the cross-sectional periphery of the tire and passing through said opening into the standard, and means in said standard engaging said flexible anchoring member for varying the effective length thereof.

4. An accessory supporting standard to be mounted upon a spare tire comprising a tubular part and a plate secured to the base portion of the tubular part, said plate being shaped to fit the contour of the adjacent part of the tire and being in abutment therewith, said standard having an opening therein, a flexible anchoring member passing about said tire and into said standard through said opening, and means in said standard engaging a portion of the flexible anchoring member within the standard and movable to vary the effective length of said flexible anchoring member.

5. In a bracket adapted to be mounted upon a spare tire, a standard comprising an upper tubular member superimposed upon a lower base member having a recess in its upper surface, a flexible anchoring member extending through said recess in the base member into said standard, and means in the standard engaging said anchoring member and movable to vary the effective length thereof.

6. A spare tire bracket including a tubular standard, an accessory supporting arm superposed upon said standard, a sleeve extending through said supporting arm and secured at its lower end to said standard, said sleeve having an upper shouldered portion abutting the upper surface of said arm, a shank having an intermediate threaded portion and a head at its upper extremity engaging the upper surface of the sleeve, said shank extending through said sleeve and into said standard, a flexible anchoring member extending into said standard, and means operably associated with the threaded portion of said shank and said flexible member, whereby rotary movement of said shank will vary the effective length of said flexible member.

HENRY HUEBER.